UNITED STATES PATENT OFFICE.

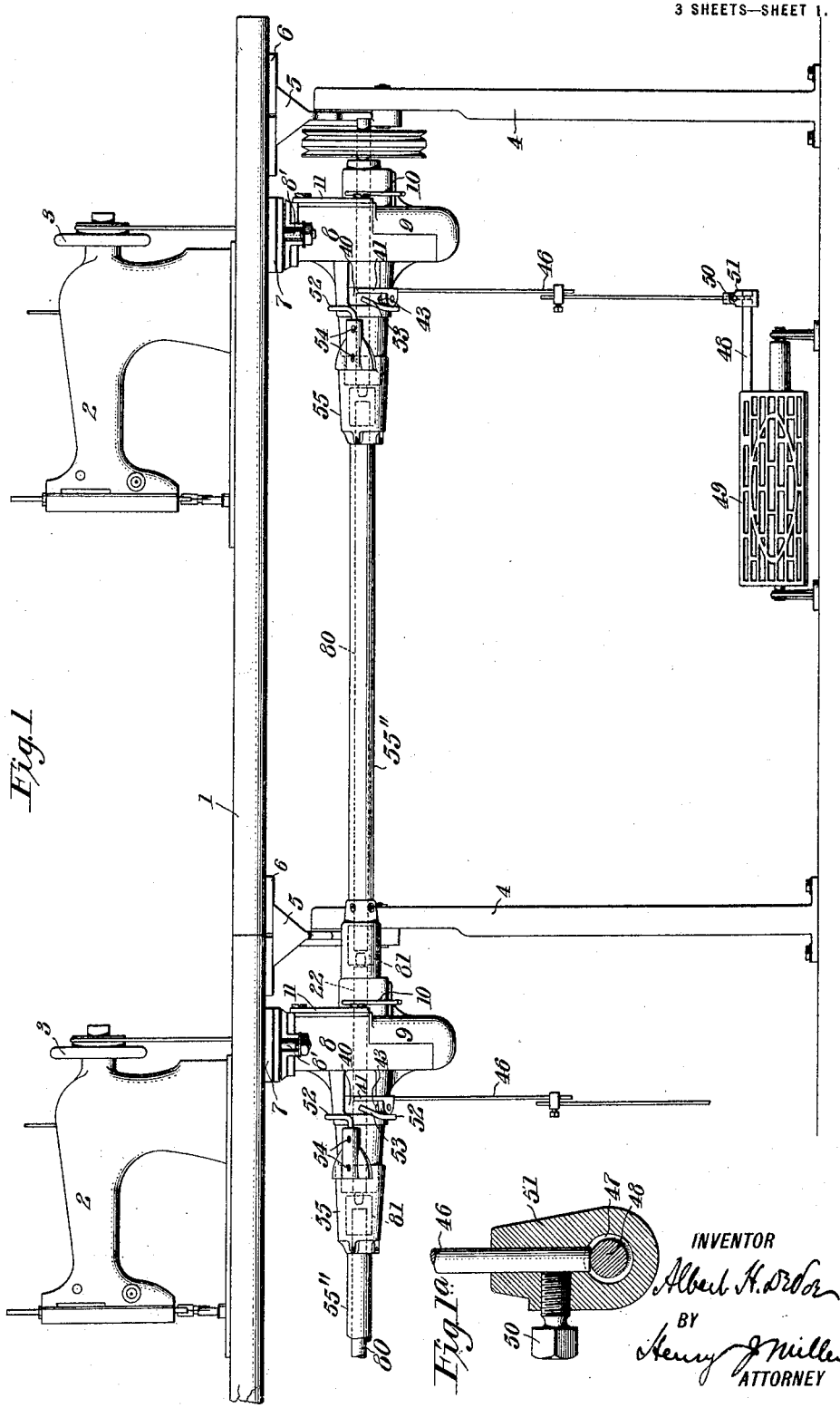

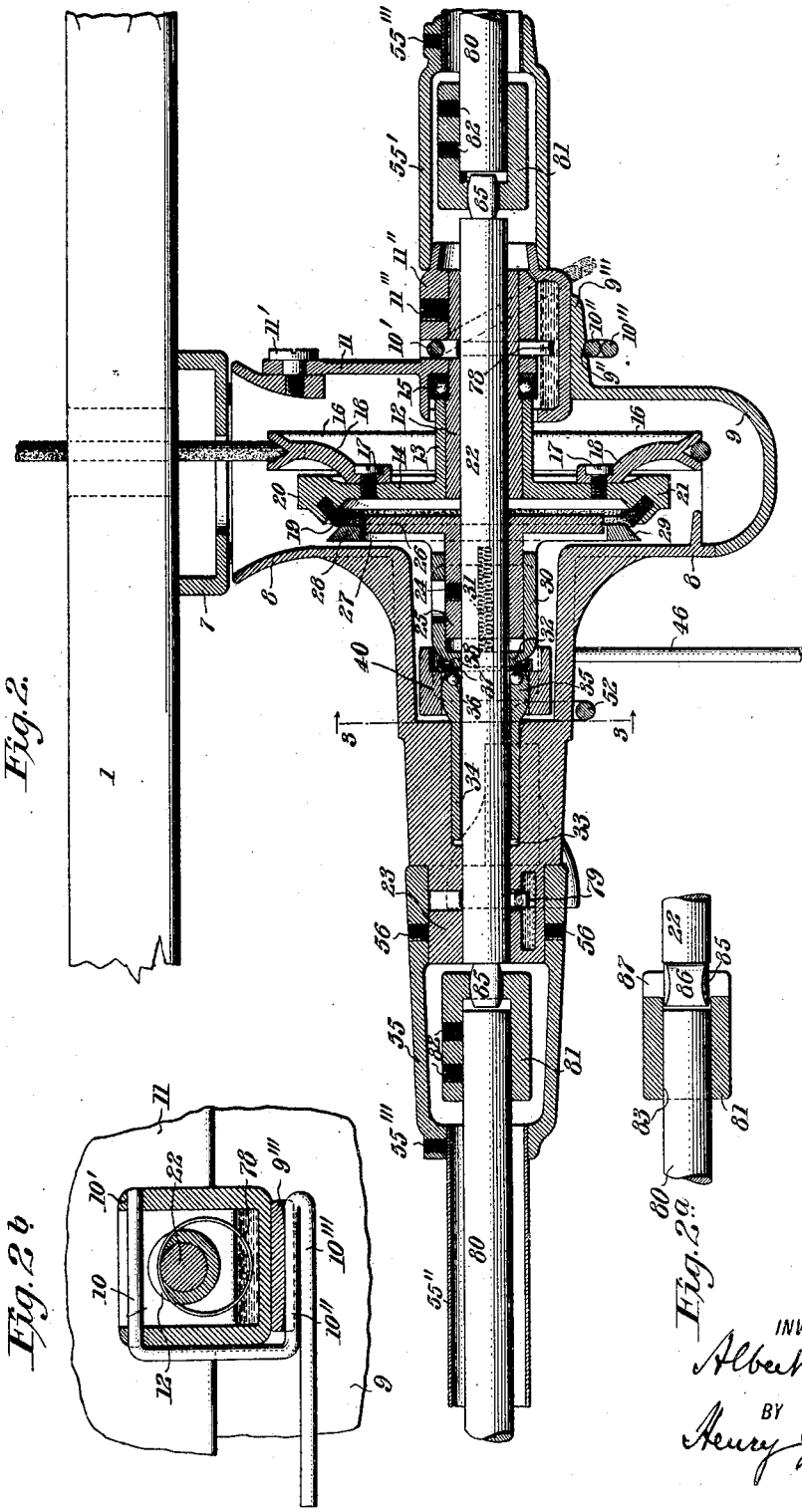

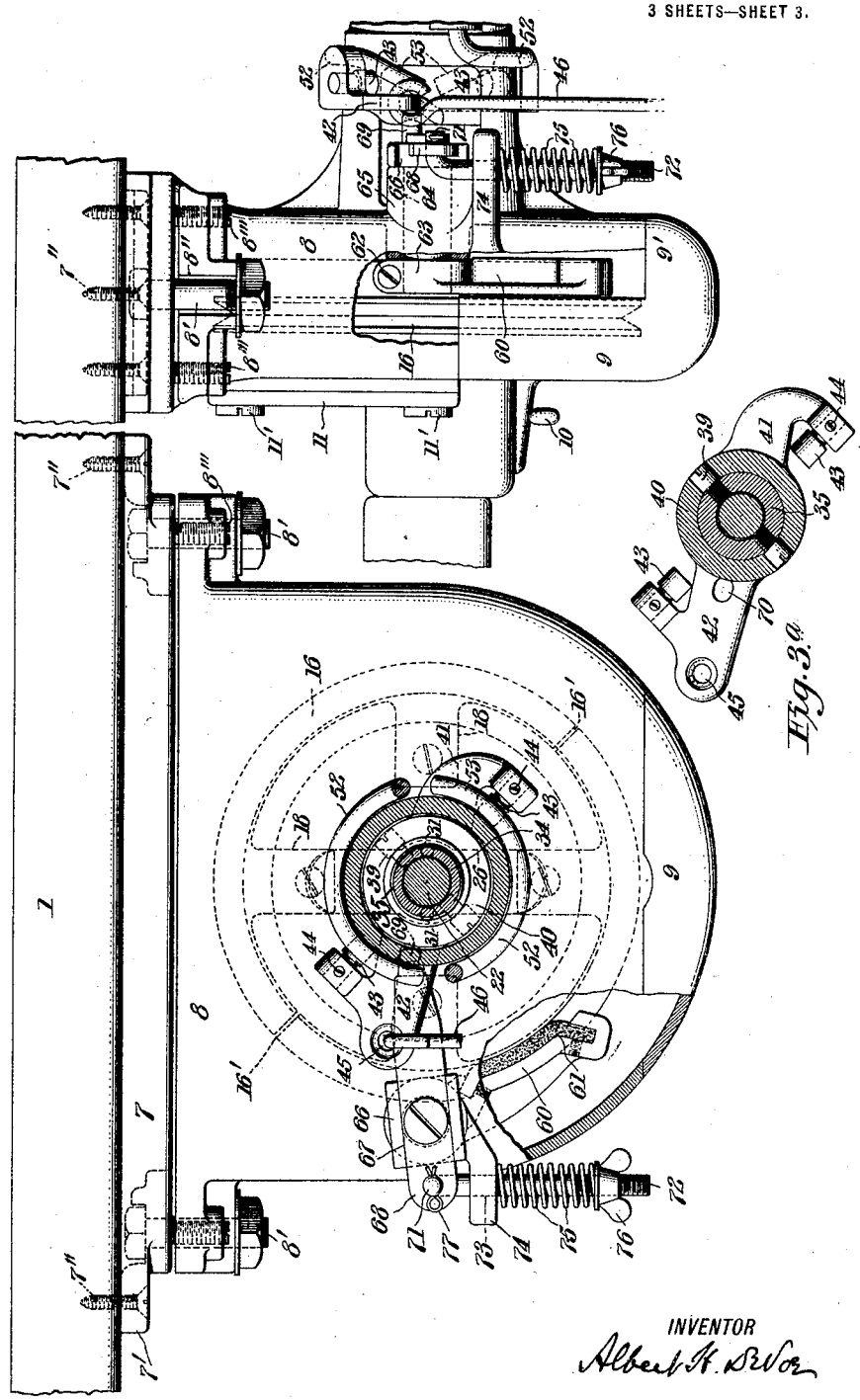

ALBERT H. DE VOE, OF WESTFIELD, NEW JERSEY, ASSIGNOR TO THE SINGER MANUFACTURING COMPANY, A CORPORATION OF NEW JERSEY.

POWER-TRANSMITTER.

1,397,088. Specification of Letters Patent. Patented Nov. 15, 1921.

Application filed June 14, 1917. Serial No. 174,647.

*To all whom it may concern:*

Be it known that I, ALBERT H. DE VOE, a citizen of the United States, residing at Westfield, in the county of Union and State of New Jersey, have invented certain new and useful Improvements in Power-Transmitters, of which the following is a specification, reference being had therein to the accompanying drawings.

The invention relates to power-transmitters for conveniently and positively controlling the operation of small machines such as sewing machines.

In such devices it has been common to establish and interrupt driving relation of clutch-members, operatively connected with a source of power and with a belt-wheel on a machine, respectively, by a sidewise movement of the clutch-members relative to each other on a common supporting shaft or its bearings. This method of operation has been found to be highly satisfactory excepting in one particular, and that is, the constant tendency of an operative to impel one clutch-member against the other with greater force than necessary to establish driving relation which results in an unnecessary amount of end thrust and consumption of power because of friction losses. It is an object of the present invention to obviate this defect and diminish the friction loss by unnecessary end thrust of the clutch members. And the mechanism for accomplishing the same essentially consists of an elastic or yielding cam or wedge-like member which coöperates with other devices to impel one of said clutch-members axially of the shaft relative to the other clutch-member. This elastic or yielding cam-member is designed to ease up on the end thrust when that amount of pressure between the clutch-members is attained at which driving relation is established.

Danger to operatives has been heretofore provided against by housings or casings inclosing moving parts constituting a menace to them. In this invention safety devices have been provided but in a new and improved form, affording numerous advantages among which may be mentioned accessibility to a belt drive for repair or replacement purposes.

In power-table construction convenience in lining up a battery of transmitters for a plurality of machines is a desideratum. To this end the line shaft is made in sections operatively connected by a species of universal joint requiring less precision in the alinement of the sections without producing binding and frictional loss in the bearings.

It is also desirable in power benches to have each transmitter complete in itself, unitary, to meet special demands of the trade and to this end each is equipped with an individual line shaft section of suitable length, preferably the same length substantially as the transmitter.

The invention also consists in certain details of construction which will appear as the description proceeds of the embodiment of the invention illustrated in the accompanying drawings, in which Figure 1 is a side elevation of a power-bench, showing two machines and transmitters therefor in working relation. Fig. 1ª is a detail of a treadle connection. Fig. 2 is a longitudinal section of the transmitter in a vertical plane through its axis. Fig. 2ª is a detail of a preferred form of universal joint for connecting shaft sections. Fig. 2ᵇ is a cross section showing a latch rendering a section of the housing conveniently detachable. Fig. 3 is a section on line 3—3, Fig. 2. Fig. 3ª is a sectional detail of the manner of supporting controller arms. Fig. 4 is a rear side elevation of the transmitter showing the relative location of the brake and controller.

As shown in the drawings, on the power-bench 1, sewing machines 2 having belt-wheels 3 are supported at intervals allowing operatives sufficient freedom from interference with one another. Below the bench transmitters are secured preferably adjacent the bench-legs 4 which are bolted to cross-bars 5 suitably secured to batten-plates 6 fastened to the bench adjacent the ends of abutting table units of the bench as shown and described in my pending application Serial No. 92,257, filed April 19, 1916.

The vital parts of the transmitter are inclosed within a housing or casing consisting of a cap-plate 7, a main section 8 and a removable section 9. The cap-plate 7 is provided with an apertured lip 7′ receiving the screws 7″ for securing it to the table. All the component parts of the transmitter are carried by this plate. The main section 8 is adjustably secured at opposite ends of the cap-plate 7 by means of two centrally arranged tension bolts 8′ fitted to slots 8″ in the main section and pairs of thrust screws 8''' are tapped into the main section on both sides of the bolts 8' with their ends resting against the cap-plate 7. The removable section 9 is formed with a lip or offset 9' extending under the main section 8 to which it is detachably secured by a latch 10, see Figs. 2 and 2ᵇ, pivoted at 10' to a bearing section 11 forming part of the main section 8. The latch 10 is U-shaped and its under leg 10'' is adapted to engage a groove 9'' in a wing 9''' of the removable section. From this groove the latch may be readily disengaged by an extension 10''' thereof within convenient reach of the operative at the front of the bench. The before mentioned bearing section 11 is secured to the main section 8 by clamp-screws 11' and is formed with a boss 11'' which is adapted to receive the set-screws 11''' for securing a bearing sleeve 12 in place.

On the bearing sleeve 12 the hub 13 of a driven clutch-member 14 is freely rotatable, the friction of the end thrust of driving relation being provided against by the ball bearings 15. To the driven clutch-member 14 a belt-wheel 16 sectioned at 16' is fastened by screws 17 passing through short spokes 18. An inwardly directed leather-ring 19 is sunk in the driven member 14 adjacent the cylindrical face 20 of the peripheral flange 21.

In the bearing sleeve 12 is supported one end of an individual transmitter shaft-section 22, the other end of which turns freely in a bearing 23 integral with the main housing section 8, see Fig. 2. Fast on the shaft-section 22 by the set-screw 24, tapped into the sleeve 25, is a dog-like element having radially disposed arms 26 slidably received by correspondingly shaped slots 27 in a friction disk 28 which is thereby compelled to rotate with the dog element. The friction disk 28 has a beveled rim 29 and integral sleeve 30 telescopically embracing the sleeve 25. Springs 31 pocketed in the fixed sleeve 25 and thrusting against the inturned flange 32 of the sliding sleeve 30 normally hold the friction disk 28 spaced from the driven member 14 out of driving relation therewith.

For establishing driving relation between the components of the clutch means are provided for moving the friction disk axially relative to the driven member in a direction opposite to that in which it is urged by the thrust of the springs 31. The bearing 23 is counter-bored at 33 to slidably support a tubular thrust member 34 free and clear of the rotating shaft-section 22. The tubular member 34 is enlarged at 35 and ball bearings 36 are fitted to a raceway therein, being retained in place by a washer 37 and split ring 38 snapped into a suitable groove. Against the washer 37 the inturned flange 32 of the friction disk is adapted to bear. As shown more clearly in Fig. 3ᵃ, trunnion-screws 39 are tapped at diametrically opposite points into the enlargement 35 of the tubular thrust member 34 with their cylindrical head portions serving as pivots for a collar 40 integral with which are rigid arms 41—42 projecting through openings in the housing and carrying anti-friction rolls 43 adjustably secured thereto by screws 44 and disposed in endwise alinement at diametrically opposite points substantially 90° from the line of the trunnion-screws 39. An ear of the rigid arm 42 is pierced as at 45 to receive one end of an adjustable treadle rod 46, the other end of which rod is fitted to a groove 47, see Fig. 1ᵃ, in a horizontal bar 48 on the treadle 49 and locked in place by the screw 50 tapped into the holder 51 as clearly shown in the drawings.

Coöperating with the friction rolls 43 are a pair of resilient yielding arms or elastic cam-rods 52 having spiral or bent portions 53. Adjustment of the arms or rods 52 longitudinally of the shaft is permitted by the screws 54, see Fig. 1, securing them to a truncated housing 55 and adjustment of the same arms or rods angularly of the shaft is afforded by the screws 56, Fig. 2, securing the housing 55 to a portion of the bearing 23.

It will thus be seen that depression of the treadle will turn the anti-friction rolls 43 into contact with the spiral or bent portions 53 of the resilient elastic arms. Continuation of this turning movement will cause the tubular thrust-member to move axially and shift the friction-disk of the driving clutch member into contact with the leather ring of the driven member thereby establishing driving relation between the components of the clutch or transmitter.

It is desirable to quickly bring the sewing machine to rest after an interruption of the driving relation and accordingly a brake is provided for this purpose. It comprises a shoe 60, Figs. 3—4, having a friction surface 61, preferably of leather secured thereto in any convenient manner, clamped by a screw 62 in its split hub 63 to a stud-pin 64 supported by a boss 65 projecting from the rear of the main housing section 8. On the opposite end of this stud-pin 64 a block 66 is suitably fixed and fitted to a seat 67 therein is a lever 68 the forward end of which is bent to form a finger 69 engaging in the recess 70, Fig. 3ᵃ, in the rigid arm 42 to which the foot-treadle is connected, while the rear end of the lever 68 is apertured to receive the end 71 of a rod 72 passing through a hole 73 in a wing portion 74 of the main section 8. A spring 75 whose tension is regulated by a thumb-nut 76 surrounds the rod 72, accidental disengagement of which from lever 68 is prevented by a cotter-pin 77.

It will be obvious from a glance at Fig. 3 that when the treadle is depressed to establish driving relation of the clutch components, the end of the lever controlling the brake shoe will be moved downward thereby carrying the brake-shoe outward away from contact with the cylindrical portion 20 of the driven member. On the other hand it will be equally clear that release of the treadle will allow the spring coiled about the rod to apply the brake-shoe to the driven member and at the same time to reversely rotate the anti-friction rolls out of contact with the cam-like or bent end portions of the resilient arms.

Ample lubrication for those portions of the shaft which are subjected to wear is afforded by the oil rings and wells shown at 78 and 79 in the bearings 11" and 23, respectively.

Where also there is considerable friction between relatively fixed and rotatable portions of the device ball bearings are provided at 15 and 36, as before mentioned, but obviously they are a nicety of mechanical construction that may be dispensed with in certain classes of mechanism.

At opposite ends of the transmitter universal joints are provided to connect up the individual shaft sections 22 with adjacent coupling shaft sections 80.

The universal joint comprises a sleeve or one-piece coupling member 81 fixed by set-screws 82 on an end of a shaft-section fitted to a socket 83. The bottom or end of the socket 83 is closed excepting for a transverse slot 84 cut diametrically across the same. On the abutting end of an adjacent shaft-section and entering the slot 84 is a tongue or projection 85 having oppositely convex cylindrical faces 86, the elements of which faces extend substantially in parallelism with the walls 87 defining the slot. Between these walls 87 the tongue 85 may turn as though pivoted on an axis intermediate and parallel therewith. Between these walls 87 the tongue 85 may also twist as though pivoted on an axis perpendicular thereto. The coöperating walls 87 and faces 86 thus constitute the effective portions of a universal joint permitting transmission of power through shaft-sections whose axes are out of parallelism and intersect at an obtuse angle. The tongue 85 is retained in the slot 84 by extending it beyond the slot and into the bore or socket 83 of the sleeve 81, provision being made for relative angular rotation of the walls and faces by reducing the width of the tongue 85 to permit a limited play of the tongue in the bore. The shaft sections may be uncoupled by merely moving them in opposite directions endwise.

Surrounding the universal joints and at opposite ends of the transmitter are truncated housings 55 and 55' between which a tubular casing 55" is supported and held against endwise movement by the screws 55'''.

From the foregoing description it will be clear that the resilient arms or cams 53 yield when driving relation is being established between them thereby insuring the transmitter against breakage by the application of pressure greatly in excess of that necessary to effect driving relation. And the resilient arms or cams may be arranged to yield when pressure is applied but slightly in excess of that necessary to establish driving relation of the driving and driven members of the transmitter. It will also be clear that the vital parts of the transmitter are accessible for repair or readjustment by reason of the removable section 9 of the housing and also by reason of the external location of the inclined wedge or cam arms 52. Further it will be apparent that the universal joints between shaft-sections eliminate the binding and friction losses inevitably concomitant upon the use of a continuous line shaft for driving a plurality of machines. Further the operation of lining up a plurality of transmitters with the construction disclosed requires far less precision than it would with a continuous line shafting thereby enabling it to be done by low grade mechanics who must be employed for such work at the present day. And finally it will be noted that the operative is fully protected from injury by the housing or casing inclosing all rotating parts.

It is to be distinctly understood that the invention is not limited to the specific construction shown and described, as the same is only illustrative of the principles of operation which are capable of extended application in various forms, and that the invention comprehends all construction within the scope of the accompanying claims.

Having thus set forth the nature of the invention, what I claim herein is:—

1. In a power-transmitter, a main shaft, driving and driven clutch-members adapted for independent rotation and relative movement axially of said shaft, means for producing relative movement between said clutch-members axially of said shaft to establish and interrupt driving relation between them, said means including a resiliently mounted cam surface adapted to yield on actuation of said means further than necessary to establish driving relation between said members.

2. In a power transmitter, a main-shaft driving and driven clutch-members adapted for independent rotation and relative movement axially of said shaft, means for producing relative movements between said clutch-members axially of said shaft to establish and interrupt driving relation between them, said means including a plurality of yielding arms having cam surfaces.

3. In a power-transmitter, a main-shaft, driving and driven clutch-members adapted for independent rotation and relative movement axially of said shaft, means for producing relative movement between said clutch-members axially of said shaft to establish and interrupt driving relation between them, said means including one or more elastic arms spirally and adjustably disposed about the axis of said shaft.

4. In a power transmitter, a main-shaft, independently rotatable driving and driven clutch-members, said members being movable relatively coaxially of said shaft, means for producing relative movement between said clutch-members axially to establish and interrupt driving relation between them, said means including a plural-armed lever rotatable about the axis of said shaft, and a spring bent around said shaft and coöperating with said lever to shift it longitudinally of said shaft.

5. In a power-transmitter, a main-shaft, driving and driven clutch members, means for producing relative movement between said driving and driven clutch-members axially of said shaft to establish or interrupt power-transmitting relation between them, said driving clutch-member having a friction element and a dog element one of which elements is fixed to said main-shaft, and an actuating cam for one of said clutch-members including a resiliently mounted cam-surface.

6. In a power-transmitter, a main-shaft, driving and driven clutch-members adapted for relative movement axially of said shaft to establish or interrupt power-transmitting relation between them, said driving clutch-member having a friction element and a dog element, telescoping sleeves on said element, the sleeve of said dog element being fixed to said shaft, and a cam-roller and coacting resilient cam for producing relative movement between said sleeves.

7. In a power-transmitter, a rotatable main-shaft, a sleeve fixed thereto having a crank-arm, a second sleeve endwise movably mounted on said first-mentioned sleeve and having a disk provided with a slot receiving said crank-arm whereby said disk is compelled to rotate with said shaft, a driven member coöperatively arranged with relation to said disk, and means for moving said second sleeve endwise to establish or interrupt a power-transmitting relation between said driven member and said disk.

8. In a power-transmitter, a main-shaft, a sleeve fixed thereto having a plurality of crank-arms, a second sleeve endwise movably mounted on said first-mentioned sleeve and having a disk provided with a plurality of radially disposed slots receiving said crank-arms whereby said disk is compelled to rotate with said shaft, a driven member coöperatively arranged with relation to said disk, and means for moving said second sleeve endwise to establish power-transmitting relation between said driven member and said disk, said means including a flexible stationary wedge.

9. In a power-transmitter, a main-shaft, driving and driven clutch-members adapted for independent rotation and relative axial movement on said shaft, means for producing relative movement between said clutch-members axially of said shaft to establish and interrupt driving relation between them, said means including resilient arms arranged around said shaft and adjustable longitudinally of the shaft.

10. In a power-transmitter, a main-shaft, driving and driven clutch-members adapted for independent rotation and relative axial movement on said shaft, means for producing relative movement between said clutch-members axially of said shaft to establish and interrupt driving relation between them, said means including resilient arms arranged about said shaft and adjustable angularly of the shaft.

11. In a power-transmitter, a main-shaft, driving and driven clutch-members adapted for independent rotation and relative axial movement on said shaft, means for producing relative movement between said clutch-members axially of said shaft to establish and interrupt driving relation between them, said means including resilient arms arranged about said shaft, said arms being adjustable longitudinally and angularly of the shaft.

12. In a power-transmitter, a main-shaft, a bearing portion for said main-shaft, driving and driven clutch-members adapted for independent rotation and relative axial movement on said shaft, means for producing movement between said clutch-members relatively to each other axially of said shaft to establish and interrupt driving relation between them, said means including a thrust-member supported internally of said bearing portion, rigid arms operatively connected with said thrust-member, and resilient arms supported externally of said bearing portion in coöperative relation with said rigid arms.

13. In a power-transmitter, a main-shaft, a bearing portion for said main-shaft, driving and driven clutch-members adapted for independent rotation and relative axial movement on said shaft, means for producing movement between said clutch-members relatively to each other axially of said shaft to establish and interrupt driving relation between them, said means including a tubular thrust-member supported internally of said bearing portion, a collar pivoted to said tubular thrust-member, arms rigid with said collar, and resilient arms supported externally of said bearing portion in coöperative relation with said rigid arms.

14. In a power-transmitter, a main housing section provided with a bearing, a second bearing fixed to said main section, a power-shaft mounted in said bearings, driving and driven clutch members mounted on said shaft adapted for independent rotation and relative axial movement thereon, means for producing relative movement between said members to establish and interrupt driving relation between them including a resiliently mounted cam surface disposed externally of the housing, and a removable housing section detachably secured to the main section whereby access may be had to the transmitter during the operation of the shaft.

In testimony whereof, I have signed my name to this specification.

ALBERT H. DE VOE.